United States Patent Office 3,044,000
Patented July 10, 1962

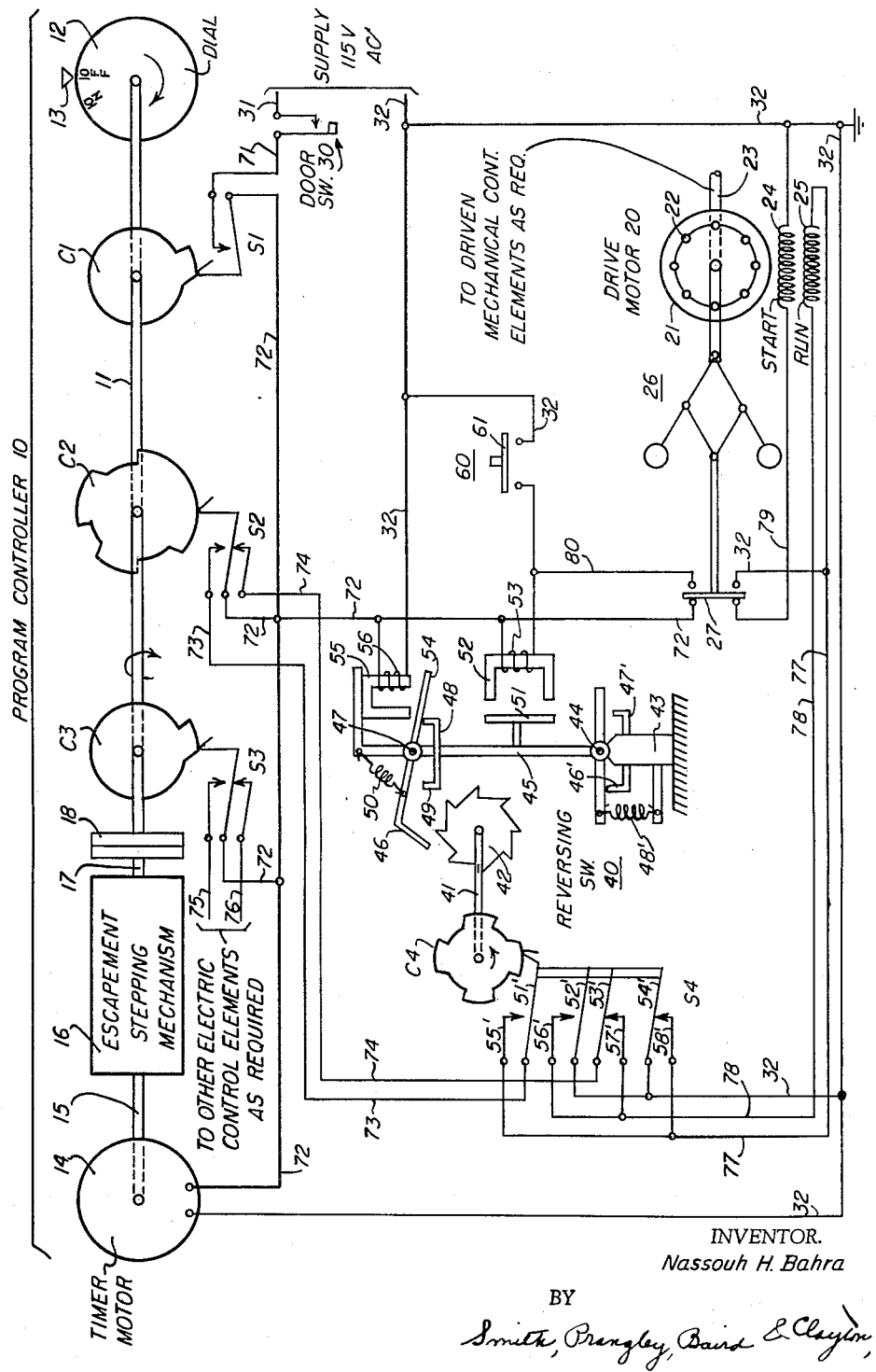

3,044,000
CONTROL CIRCUITS FOR HOME APPLIANCES
OR THE LIKE
Nassouh H. Bahra, Mazra, Damascus, Syria, assignor to General Electric Company, a corporation of New York
Filed Oct. 24, 1957, Ser. No. 692,082
13 Claims. (Cl. 318—203)

The present invention relates to control circuits for home appliances, or the like, and more particularly to such a control circuit incorporating improved facility for effecting quick reversal of the electric drive motor of the appliance under the control of the associated program controller thereof.

A conventional home appliance, such as a dishwasher, a clothes washing machine, etc., frequently incorporates a reversible electric drive motor that effects two different operations or functions in the appliance in response to operation thereof in the two different directions of rotation thereof, as well as an associated program controller for selectively governing the direction of operation of the drive motor.

For example, in a dishwasher, rotation of the rotor of the electric motor in one direction may operate the impeller to effect the dishwashing action, while rotation of the rotor in the opposite direction may operate the pump to effect the removal of the wash water from the vat. On the other hand, in a clothes washing machine, rotation of the rotor of the electric motor in one direction may operate the agitator to effect the clothes washing action, while rotation of the rotor in the opposite direction may rotate the clothes-receiving tub to effect the centrifugal extraction of the water from the clothes.

In the appliance, the electric motor is usually of the split-phase induction type, including a rotor carrying a squirrel-cage winding and a cooperating stator carrying start and run windings, as well as speed-responsive switching mechanism for selectively controlling the energization of the start winding, the start winding being energized only during starting of the rotor. Also, in the associated control circuit, a reversing switch is provided for selectively controlling the polarity of the run winding, and consequently the direction of rotation of the rotor, the reversing switch being repeatedly controlled, as required, by the program controller in the cycle of operation of the appliance.

The program controller conventionally comprises an electric timer motor, associated escapement stepping mechanism, a rotatably mounted shaft for governing the required control switches, and a manual dial for operating the program controller from its off position into its on position. In the arrangement, when the manual dial is operated into its on position, operation of the electric timer motor is initiated, so that the escapement stepping mechanism is governed to effect periodic stepping of the control shaft in order to bring about cyclic governing of the control switches; whereby the shaft is ultimately rotated back into its off position at the conclusion of the cycle of the appliance. More particularly, the escapement stepping mechanism may rotate the shaft through an arc of several degrees at the expiration of each time interval of 30 seconds, 45 seconds, etc., depending upon the design of the mechanism.

Accordingly in the cyclic operation of an appliance of the character described, the shaft of the program controller is rotated from one of its positions into another of its positions at the expiration of the time interval mentioned (for example, 30 seconds), and then rotated from its other position into a further of its positions at the expiration of an additional time interval of 30 seconds. In the arrangement, the rotor of the drive motor may be rotated in one direction, while the shaft occupies its one position, and the rotor may be rotated in the opposite direction while the shaft occupies its further position; whereby the rotor is at rest throughout a great proportion of the time interval, while the shaft occupies its other position intermediate its one position and its further position. Thus, substantially all of this time interval mentioned is wasted in the cycle operation of the appliance; and moreover, when the drive motor thereof ceases to operate in the time interval mentioned, the user of the appliance frequently concludes that the appliance is out-of-order.

Now this delay in the reversal of the direction of rotation of the rotor of the drive motor in a conventional appliance is inherent in the cycle of operation thereof as the other position of the shaft of the program controller thereof must be disposed between the one position thereof and the further position thereof, and the shaft must occupy its other position for the time duration of the time interval of 30 seconds, notwithstanding the fact that the actual time to effect stopping of rotation of the rotor may be only a matter of a few seconds.

Accordingly, it is a general object of the present invention to provide a control circuit for home appliances, or the like, that incorporates improved facility for effecting quick reversal of the electric drive motor of the appliance under the control of the associated program controller of the stepping type.

Another object of the invention is to provide a control circuit of the character described, wherein the time interval required to effect reversal of the rotor of the electric drive motor between full speed in opposite directions is substantially shorter than the stepping time interval of the associated program controller.

A further object of the invention is to provide a control circuit of the character described that is of simple connection and arrangement, and that is positive in operation, requiring no supervision by the operator of the appliance into which the control circuit is incorporated.

Further features of the invention pertain to the particular arrangement of the elements of the electric control circuit for the appliance, whereby the above-outlined and additional operating features thereof are attained.

The invention, both as to its organization and method of operation, together with further objects and advantages, will best be understood by reference to the following specification taken in connection with the accompanying drawing, in which:

The single FIGURE is a diagrammatic illustration of the electric control circuit for a home appliance, or the like, embodying the present invention.

Referring now to the drawing, the electric control circuit there illustrated is adapted to be incorporated into a home appliance, such, for example, as a dishwasher, a clothes washing machine, etc., and comprises a program controller 10 provided with a rotatably mounted control shaft 11 carrying a manual dial 12 on the outer end thereof, the dial 12 being provided with the indicia "off" and "on" cooperating with an associated index marker 13. The control shaft 11 carries a plurality of insulating cams, three of which are respectively indicated at C1, C2 and C3; which cams cooperate with three sets of switch springs S1, S2 and S3. In the arrangement: the cam C1 comprises a main switching cam; the cam C2 comprises a reversing cam; and the cam C3 comprises a control cam. Also, the program controller 10 comprises an electric motor 14 of the synchronous type, preferably a "Telechron" timer motor, having an operating shaft 15 that is continuously rotated at a predetermined time rate. Further, the program controller 10 comprises an escapement stepping mechanism 16 of a well-known type provided with a drive shaft, not shown, connected to the timer motor shaft 15, and a driven shaft 17 that is connected by a friction clutch 18 to the inner end of the control shaft 11. In the arrangement, the constant timed rotation of the timer shaft 15 effects periodic stepped rotation of the driven shaft 17 through successive small arcs of a few degrees each; whereby the shaft 17 is rotated step-by-step through the small arcs mentioned imparting such stepped rotation to the control shaft 11 through the friction clutch 18. For instance, the escapement stepping mechanism 16 may impart three degrees of angular rotation to the driven shaft 17 each 30 seconds.

In the operation of the program controller 10, when the manual dial 12 is rotated from its "off" position into its "on" position, the control shaft 11 is thus rotated therewith and with respect to the shaft 17, the friction clutch 18 accommodating the relative rotation mentioned. As indicated, the dial 12 is rotated in the clockwise direction into its "on" position; whereby operation of the timer motor 14 is initiated, as explained more fully hereinafter, so that the escapement stepping mechanism 16 effects further step-by-step rotation of the driven shaft 17 in the clockwise direction, so that the control shaft 11 is similarly rotated step by step in the clockwise direction through the friction clutch 18 and back into its "off" position. Upon the return of the manual dial 12 back into its "off" position, operation of the timer motor 14 is arrested, and during the time interval of operation of the control shaft 11 from its "on" position back into its "off" position, the control cams C1, C2 and C3 govern the associated sets of switch springs S1, S2 and S3 in order to carry out a cycle of operation of the associated appliance, as explained more fully hereinafter.

It is further assumed that the home appliance into which the control circuit is incorporated comprises a main electric drive motor 20 of the split-phase induction type including a rotor 21 carrying a squirrel-cage winding 22 and a stator, not shown, carrying a start winding 24 and a run winding 25, the windings 24 and 25 normally being disposed in quadrature relation with respect to each other. The rotor 21 is secured to an operating shaft 23 that extends to the driven mechanical control elements, not shown, of the appliance. Moreover, it is assumed that the rotations of the operating shaft 23 in the opposite directions effect two different useful functions in the appliance. Also, the operating shaft 23 is connected to speed-responsive mechanism 26, that, in turn, is connected to a contact bridging member 27 provided with both front and rear contact sets. Also, it is assumed that the appliance is provided with a door, not shown, affording access to a process chamber provided therein and that this door selectively operates an associated door switch 30, the door switch 30 occupying its respective open and closed position, when the door occupies its respective open and closed positions. Also, the appliance is provided with a source of electric power supply of 115 volts, single-phase, A.C., including a pair of line conductors 31 and 32, the line conductor 32 being connected to ground potential. Further, the control circuit comprises a reversing switch 40 including a rotatably mounted operating shaft 41 carrying an insulating control cam C4 on one end thereof and a ratchet wheel 42 on the other end thereof, and a set of switch springs S4 arranged in cooperating relation with the control cam C4. The set of switch springs S4 includes four movable springs 51', 52', 53' and 54' that respectively cooperate with four stationary springs 55', 56', 57' and 58'. The control cam C4 is of the two-level type, including four high levels and four intervening low levels. When the control cam C4 occupies the position of any one of its four high levels, the set of switch springs S4 is operated to open the sets of springs 51'—55' and 52'—56' and to close the sets of springs 53'—57' and 54'—58'. On the other hand, when the control cam C4 occupies the position of any one of its four low levels, the set of switch springs S4 is operated to close the sets of spring 51'—55' and 52'—56' and to open the sets of springs 53'—57' and 54'—58'. The ratchet wheel 42 is provided with eight teeth disposed about the periphery thereof and respectively corresponding to the eight positions of the control cam C4, as explained more fully hereinafter.

Further, the reversing switch 40 comprises a support 43 upon which there is pivotally mounted, at 44, a lever 45, the lever 45 being movable between a released position, as established by a cooperating stop 46' and an operated position, as established by a cooperating stop 47', the lever 45 being biased into its released position, as illustrated, by a coil spring 48' extending between the lever 45 and the support 43. A pawl 46 is pivotally mounted at 47 upon the lever 45 and is movable between a released position, as established by a cooperating stop 48, and an operated position, as established by a cooperating stop 49, the pawl 46 being biased into its released position, as illustrated, by a coil spring 50 extending between the pawl 46 and the lever 45. When the pawl 46 occupies its released position illustrated, the operating end thereof is disposed out of engagement with the teeth provided about the periphery of the ratchet wheel 42; and when the pawl 46 occupies its operated position, the operating end thereof is disposed in engagement with the teeth provided about the periphery of the ratchet wheel 42. Further, the lever 45 is provided with a magnetic armature 51 that cooperates with a field piece 52 provided with a winding 53; the field piece 52 being externally supported in any suitable manner, not shown. Similarly, the pawl 46 is provided with a magnetic armature 54 that cooperates with a field piece 55 provided with a winding 56, the field piece 55 being mounted upon the lever 45.

Considering now in greater detail the mode of operation of the reversing switch 40, the lever 45 normally occupies its released position illustrated, and is rotatable in the clockwise direction about the pivot 44 against the bias of the coil spring 48' in response to attraction of the armature 51 by the field piece 52 upon energization of the winding 53. Subsequently upon the deenergization of the winding 53, the armature 51 is released, so that the lever 45 is returned back into its released position by the coil spring 48. The pawl 46 normally occupies its released position illustrated, and is rotatable in the counterclockwise direction about the pivot 47 against the biasing of the coil spring 50 in response to attraction of the armature 54 by the field piece 55 upon energization of the winding 56. Subsequently, upon the deenergization of the winding 56, the armature 54 is released so that the pawl 46 is returned back into its released position by the coil spring 50. When the lever 45 is returned from its operated position back into its released position, the pawl 46 rotates the ratchet wheel 42 one step in the counterclockwise direction only in the event the pawl 46 occupies its operated position. Accordingly, when the pawl 46 occupies its operated position, the ratchet wheel 42 is rotated step by step in the counterclockwise direction in response to each return of the lever 45 from its operated position back into its restored position, whereby the control cam C4 alternately presents a high level and a low level to the associated set of switch springs S4, for a purpose more fully explained hereinafter.

Further, the control circuit comprises an emergency start switch 60 of the push button type, including a contact bridging member 61 and an associated pair of front contacts; and further, it is assumed that the appliance includes other electric control elements, as required, not shown.

In the circuit arrangement, the line conductor 31 is connected to one spring of the door switch 30, and the other spring thereof is connected to a conductor 71. The conductor 71 is connected to one spring of the set of switch springs S1, and the other spring thereof is connected to a conductor 72 that is connected to the middle spring of the set of switch springs S2, to the middle spring of the set of switch springs S3 and to one terminal of the timer motor 14; the other terminal of the timer motor 14 being connected to the grounded line conductor 32. The top and bottom springs of the set of switch springs S2 are respectively connected to two conductors 73 and 74 that are respectively terminated by the switch springs 51' and 53' of the set of switch springs S4. The top and bottom switch springs of the set of switch springs S3 are respectively connected to two conductors 75 and 76 that extend to the other electric control elements, not shown, of the appliance. The switch springs 55' and 58' are connected in multiple to a conductor 77; the switch springs 56' and 57' are connected in multiple to a conductor 78; and the switch springs 52' and 54' are connected in multiple into the grounded line conductor 32. The run winding 25 is bridged across the conductors 77 and 78, while the start winding 24 is bridged between the grounded line conductor 32 and a conductor 79. The back contacts associated with the contact bridging member 27 are respectively connected to the conductors 72 and 79, while the front contacts associated with the contact bridging member 27 are respectively connected to a conductor 80 and to the grounded line conductor 32. The front contacts associated with the contact bridging member 61 are respectively connected to the conductor 80 and to the grounded line conductor 32; the winding 53 is bridged between the conductors 72 and 80; and the winding 56 is bridged between the conductor 72 and the grounded line conductor 32.

Considering now the mode of operation of the appliance, when the manual dial 12 of the program controller 10 occupies its "off" position illustrated, the high portion of the cam C1 operates the set of switch springs S1 into its open position, the high portion of the control cam C2 operates the set of switch springs S2 to close the middle and lower springs thereof and to open the upper and middle springs thereof, and the high portion of the control cam C3 operates the set of switch springs S3 to close the middle and lower springs thereof and to open the upper and middle springs thereof. Also at this time, it may be assumed that the door, not shown, of the appliance occupies its open position so that the door switch 30 occupies its open position; and moreover, it is assumed that one of the high portions of the control cam C4 operates the set of switch springs S4 to close the springs 53'—57' and 54'—58' and to open the springs 51'—55' and 52'—56'. The rotor 21 of the drive motor 20 is at rest so that the speed responsive mechanism 26 operates the contact bridging member 27 to close the associated back contacts and to open the associated front contacts; the emergency start switch 60 occupies its open position; the windings 53 and 56 are deenergized; and the timer motor 14 is at rest.

In order to place the appliance in use the operator closes the door thereof, not shown, effecting closure of the door switch 30, and then operates the manual dial 12 from its "off" position into its "on" position, the dial 12 being rotated in the clockwise direction as previously noted; whereby the low portion of the control cam C1 closes the set of switch springs S1 bringing about the connection of the conductor 72 to the line conductor 31. When power is thus connected to the conductor 72, a circuit is completed for operating the timer motor 14, whereby the escapement stepping mechanism 16 is operated so that as time proceeds, the control shaft 11 is rotated step by step in the clockwise direction and back into its "off" position as previously explained.

Also, when power is connected to the conductor 72, a circuit, including the contact bridging member 27 and the back contacts thereof, is completed for energizing the start winding 24, and a circuit is completed for energizing the run winding 25 with a first polarity. More particularly, the conductor 72 is connected via the middle and lower springs of the set of switch springs S2 to the conductor 74 and thence via the springs 53' and 57' of the set of switch springs S4 to the conductor 78, while the grounded line conductor 32 is connected via the springs 54' and 58' of the set of switch springs S4 to the conductor 77. Accordingly, the run winding 25 is energized with the first polarity, the left-hand terminal thereof being connected to high potential and the right-hand terminal thereof being connected to ground potential. It may be assumed that when the run winding 25 is thus energized with this first polarity that the rotor 21 is rotated in the clockwise direction effecting corresponding rotation of the operating shaft 23. When the operating shaft 23 is accelerated to a speed somewhat in excess of one-half of the synchronous speed of the motor 20, the speed responsive mechanism 26 is governed to control the contact bridging member 27. More particularly, the contact bridging member 27 is operated to open its back contacts and to close its front contacts. Opening of the back contacts associated with the contact bridging member 27 interrupts the previously traced circuit for energizing the start winding 24, so that the motor 20 continues to operate in response to energization of the run winding 25 thereof in response to energization of the run winding 25 thereof and quickly reaches its normal operating speed. Closure of the front contacts associated with the contact bridging member 27 completes a circuit for energizing the winding 53, whereby the armature 51 is attracted by the field piece 52 operating the lever 45 from its released position into its operated position. Also when power is connected to the conductor 72, a circuit is completed for energizing the winding 56, so that the armature 54 is attracted by the field piece 55 rotating the pawl 46 from its restored position into its operated position. Thus at this time, the lever 45 occupies its operated position storing energy in the coil spring 48' and the pawl 46 occupies its operated position, so that the operating end thereof cooperates with the teeth disposed about the periphery of the ratchet wheel 42.

Also, at this time, it may be assumed that the low portion of the control cam C3 operates the set of switch springs S3 to close the middle and upper springs thereof; whereby power is connected to the conductor 75 for the purpose of governing other electric control elements, not shown, of the appliance. Also, it will be understood that the clockwise rotation of the operating shaft 23 of the drive motor 20 brings about the first useful function of the connected mechanical control elements, not shown, in the appliance.

As time proceeds, the shaft 11 is rotated step by step in the clockwise direction, as previously noted; whereby subsequently the low portion of the control cam C2 cooperates with the set of switch springs S2 operating the middle spring to disengage the lower spring and to engage the upper spring thereof, so that the power is disconnected from the conductor 74 and is connected to the conductor 73. When power is thus disconnected from the conductor 74, the previously traced circuit for energizing the run winding 25 is interrupted, whereby the rotor 21 quickly decelerates below its normal operating speed and somewhat below one-half of its synchronous speed, so that the speed responsive mechanism 26 is operated. More particularly, the speed responsive device 26 operates the contact bridging member 27 to open its front contacts and to close its back contacts. Opening of the front contacts associated with the contact bridging member 27 interrupts the previously traced circuit for energizing the winding 53, whereby the armature 51 is released causing the lever 45 to be returned into its released position by the coil spring 48', with the result that the ratchet wheel 42 is rotated one step in the counterclockwise direction by virtue of the fact that the pawl 46 occupies its operation position. Closure of the back contacts associated with the contact bridging member 27 recompletes the previously traced circuit for energizing the start winding 24. When the control cam C4 is rotated one step in the counterclockwise direction, the low portion thereof cooperates with the set of switch springs S4, whereby the set of switch springs S4 is operated to close the contacts between the springs 51'—55' and 52'—56' and to open the contacts between the springs 53'—57' and 54'—58'. Closure of the springs 51'—55' of the set of switch springs S4 connects the conductor 73 to the conductor 77, while closure of the springs 52'—56' of the set of switch springs S4 connects the grounded line conductor 32 to the conductor 78. Accordingly, the run winding 25 is energized with the second polarity, the left-hand terminal thereof being connected to ground potential and the right-hand terminal thereof being connected to high potential. It may be assumed that when the run winding 25 is thus energized with this second polarity, that the rotor 21 is rotated in the counterclockwise direction effecting corresponding rotation of the operating shaft 23.

Accordingly, when the set of switch springs S2 is operated to open the middle and lower springs thereof and to close the middle and upper springs thereof, as described above, the reversing switch 40 is operated one step to effect the reversal of polarity of the run winding 25 of the main drive motor 20, in response to deceleration of the rotor 21 to somewhat below one-half synchronous speed to effect operation of the speed responsive device 26. Hence, the continued rotation of the rotor 21 in the clockwise direction is quickly braked and rotation thereof in the counterclockwise direction is immediately effected. Again, when the rotor 21 is accelerated in the counterclockwise direction to a speed somewhat in excess of one-half synchronous speed, the speed responsive device 26 is reoperated. More particularly, the speed responsive device 26 operates the contact bridging member 27 to open its back contacts and to close its front contacts, so that the start winding 24 is deenergized and the winding 53 is again energized. At this time, the rotor 21 is accelerated in the counterclockwise direction into its normal operating speed by virtue of the energization of the run winding 25, while the lever 45 is again rotated into its operated position, so that the pawl 46 prepares the ratchet wheel 42 for an additional step of rotation in the counterclockwise direction.

Operation of the program controller 10 continues, and still subsequently the high portion of the control cam C2 is brought into cooperating relation with the set of switch springs S2, so that the same is operated to open the middle and upper springs thereof and to reclose the middle and lower springs thereof. Accordingly, power is removed from the conductor 73 and reapplied to the conductor 74, whereby the run winding 25 is deenergized, so that the rotor 21 decelerates effecting the control of the speed responsive device 26, with the result that the winding 53 is deenergized and the start winding 24 is again energized. The armature 51 is released, so that the lever 45 is returned into its released position, with the result that the pawl 46 rotates the ratchet wheel 42 an additional step in the counterclockwise direction; whereby the high portion of the control cam C4 again cooperates with the set of switch springs S4, with the result that the polarity of the run winding 25 is again reversed. Accordingly, rotation of the rotor 21 in the counterclockwise direction is quickly braked and rotation thereof again in the clockwise direction is immediately effected.

In view of the foregoing description of the mode of operation of the control circuit, it will be understood that each time a high portion of the control cam C2 cooperates with the set of switch springs S2, the rotor 21 is rotated in the clockwise direction; and each time a low portion of the control cam C2 cooperates with the set of switch springs S2, the rotor 21 is rotated in the counterclockwise direction. Moreover, each time the position of the set of switch springs S2 is thus changed, there is dynamic braking of the rotor 21 in its then operating direction, together with reversal and running thereof in the opposite direction.

Ultimately, the program controller 10 is returned back into its "off" position so that the "off" indicia carried by the manual dial 12 cooperates with the index marker 13, whereupon the control cam C1 opens the set of switch springs S1 so as to remove power from the conductor 72, with the result that further operation of the timer motor 14 is arrested. Also, when power is thus removed from the conductor 72, the winding 56 is deenergized, with the result that the armature 54 is released so that the pawl 46 is returned back into its released position by the coil spring 50 in order that the operating end thereof is moved into disengagement with respect to the teeth provided on the periphery of the ratchet wheel 42. Also, the removal of power from the conductor 72 interrupts the circuit for energizing the winding 53, with the result that the armature 51 is released, so that the lever 45 is returned back into its released position by the coil spring 48. In this case, the return of the lever 45 from its operated position back into its released position does not bring about stepping of the ratchet wheel 42 by virtue of the fact that the pawl 46 also occupies its released position. Hence, in this case, at the conclusion of the cycle of the program controller 10, the control cam C4 occupies its normal position, a high portion thereof cooperating with the set of switch springs S4, so that the set of switch springs S4 occupies its normal position, thereby establishing the normal or first polarity of the run winding 25, so that in the next cycle of operation of the program controller 10, rotation of the rotor 21 in the clockwise direction will be initiated in the manner previously explained. Also, at this time, the removal of power from the conductor 72 interrupts the circuit for energizing the run winding 25, with the result that rotation of the rotor 21 is arrested, so that the speed responsive device 26 returns the contact bridging member 27 into its normal position opening the front contacts thereof and closing the back contacts thereof. Finally, the removal of power from the conductor 72 brings about the removal of power from the conductor 76, with the result that all of the other electric control elements, not shown, of the appliance occupy their normal deenergized positions.

Reconsidering the mode of operation of the control circuit, it is noted that in the cycle of the program controller 10, the operator of the appliance may open the door thereof effecting opening of the door switch 30 and the consequent removal of power from the conductors 71 and 72. Also in the cycle of the program controller 10, there is the possibility of power failure with respect to the source of power supply. In either case, power is removed from the conductor 72, with the result that the windings 56 and 53 are deenergized so that the pawl 46 is returned into its restored position and the lever 45 is returned into its restored position. In this case, the pawl 46 is actually returned into its restored position ahead of the return of the lever 45 into its restored position, since the pawl 46 is of relatively light weight with respect to the lever 45. Hence in this case, the return of the lever 45 into its released position does not bring about stepping of the ratchet wheel 42, since the pawl 46 occupies it released position, whereby the control cam C4 remains in its last-operated position in order that there is no reversal of the polarity of the run winding 25 of the main drive motor 20.

Accordingly, in this case, when power is subsequently returned upon the conductor 72, as by the reclosure of the door switch 30, rotation of the rotor 21 is initiated in the direction in which it was last operated and preceding the removal of the power from the conductor 72. The last mentioned arrangement is very advantageous in view of the fact that it preserves the desired sequence of events in the cycle of operation of the program controller 10, notwithstanding repeated removals of power from the conductor 72 during a cycle of operation thereof.

Again reconsidering the mode of operation of the control circuit, there is the possibility that the operator of the appliance may rotate the manual dial 12 of the program controller 10 out of its off position past its on position and into the intermediate portion of the cycle before closure of the door 30, so that the control cam C2 operates the set of switch springs S2 to connect the conductor 72 to the one of the conductors 73 or 74 opposite from the position of the switch springs S4. In this case, the corresponding circuit for energizing the run winding 25 of the drive motor 20 is open in the set of switch springs S4, so that the main drive motor 20 is not operated. In order to initiate operation of the main drive motor 20 under these conditions, it is only necessary for the operator of the appliance momentarily to operate the emergency start push button 60, whereby the contact bridging member 61 completes at the associated front contacts an alternative circuit for energizing the winding 53 so as to effect operation of the lever 45 into its operated position. Upon the subsequent release of the emergency start button 60, the circuit for energizing the winding 53 is interrupted so that the lever 45 is returned into its released position driving the ratchet wheel 42 one step in the counterclockwise direction, so that the control cam C4 operates the set of switch springs S4 into its opposite position, thereby completing either the forward circuit or the reverse circuit for energizing the run winding 25, whereby operation of the drive motor 20 in the required direction is initiated.

The last mentioned arrangement is highly advantageous as it permits the operator of the appliance to initiate operation thereof at any portion in the cycle of the program controller 10. However, it is pointed out that even though the emergency start push button 60 is not operated, the cycle of the appliance will be subsequently picked up when the program controller 10 is operated into a subsequent portion of its cycle, so that the control cam C2 operates the set of switch springs S2 into a position corresponding to the position of the set of switch springs S4.

In view of the foregoing description of the mode of operation of the control circuit, it will be understood that immediately upon a step of the program controller 10 in which the control cam C2 operates the set of switch springs S2, rotation of the rotor 21 in one direction is arrested and then dynamically braked and then rotation of the rotor in the opposite direction is initiated, whereby the complete reversal of the normal operating speed of the rotor 21 from one direction to the other may consume a time interval of only a few seconds, as contrasted with the time interval of 30 seconds of the program controller 10 into its next step. Accordingly, the present arrangement is very advantageous in view of the fact that it conserves or saves in the overall time cycle of the appliance a susbtantial proportion of each of the time intervals of 30 seconds in which reversal of the direction of the operating shaft 23 is desired; whereby the total savings or conservation of time in the cycle of operation of the appliance may have an accumulated value of several minutes. Accordingly, the arrangement appreciably shortens the normal cycle of operation of the appliance to the great convenience of the operator thereof.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, a reversible electric drive motor, a line connectible to a source of electric power, a program controller having an off position and an on position and a plurality of control positions, manually operable means for operating said program controller from its off position into its on position, an electric timer motor operated from said line for operating said program controller step by step in a timed cycle from its on position through its plurality of control positions and back into its off position, a forward circuit for operating said drive motor in the forward direction from said line, a reverse circuit for operating said drive motor in the reverse direction from said line, means responsive to operation of said program controller into a first of its control positions for completing said forward circuit, means responsive to operation of said program controller into a second of its control positions for interrupting said forward circuit and for preparing said reverse circuit, a reversing switch to complete said prepared reverse circuit, in the speed of forward operation of said motor following interruption of said forward circuit for operating said reversing switch to camplete said prepared reverse circuit, so that dynamic braking of forward operation of said motor is brought about and then reverse operation of said motor is effected.

2. In combination, a reversible electric drive motor, a line connectible to a source of electric power, a program controller having an off position and an on position and a plurality of control positions, manually operable means for operating said program controller from its off position into its on position, an electric timer motor operated from said line for operating said program controller step by step in a timed cycle from its on position through its plurality of control positions and back into its off position, a forward circuit for operating said drive motor in the forward direction from said line, a reverse circuit for operating said drive motor in the reverse direction from said line, means responsive to operation of said program controller into a first of its control positions for completing said forward circuit, means responsive to operations of said program controller into a second of its control positions for interrupting said forward circuit and for preparing said reverse circuit, a reversing switch, means responsive to the reduction in the speed of forward operation of said motor following interruption of said forward circuit for operating said reversing switch to complete said prepared reverse circuit, so that dynamic braking of forward operation of said motor is brought about and then reverse operation of said motor is effected, means responsive to operation of said program controller into a third of its control positions for interrupting said reverse circuit and for preparing said forward circuit, and means responsive to the reduction in the speed of reverse operation of said motor following interruption of said reverse circuit for operating said reversing switch to complete said prepared forward circuit, so that dynamic braking of reverse operation of said motor is brought about and then forward operation of said motor is again effected.

3. In combination, an electric drive motor provided with a reversible rotor and a stator having start and run windings, a line connectible to a source of electric power, a program controller having an off position and an on position and a plurality of control positions, manually operable means for operating said program controller from its off position into its on position, a timer motor operated from said line for operating said program controller step by step in a timed cycle from its on position through its plurality of control positions and back into its off position, a start circuit for energizing said start winding from said line, means responsive to operation of said program controller out of its off position for preparing said start circuit and responsive to operation of said program controller back into its off position for interrupting said start circuit, a start switch having closed and open positions respectively completing and interrupting said prepared start circuit, mechanism responsive to respective low and high speeds of said rotor for selectively operating said start switch into its respective closed and open positions, a forward circuit for energizing said run winding in the forward direction from said line, a reverse circuit for energizing said run winding in the reverse direction from said line, means responsive to operation of said program controller into a first of its control positions for completing said forward circuit, so that starting of forward rotation of said rotor is effected, means responsive to operation of said program controller into a second of its control positions for interrupting said forward circuit and for preparing said reverse circuit, a reversing switch, and means controlled by said mechanism in response to the reduction in the forward speed of said rotor from said high speed to said low speed following interruption of said forward circuit for operating said reversing switch to complete said prepared reverse circuit, so that dynamic braking of forward rotation of said rotor is brought about and then starting of reverse rotation of said rotor is effected.

4. In combination, an electric drive motor provided with a reversible rotor and a stator having start and run windings, a line connectible to a source of electric power, a program controller having an off position and an on position and a plurality of control positions, manually operable means for operating said program controller from its off position into its on position, a timer motor operated from said line for operating said program controller step by step in a timed cycle from its on position through its plurality of control positions and back into its off position, a start circuit for energizing said start winding from said line, means responsive to operation of said program controller out of its off position for preparing said start circuit and responsive to operation of said program controller back into its off position for interrupting said start circuit, a start switch having closed and open positions respectively completing and interrupting said prepared start circuit, mechanism responsive to respective low and high speeds of said rotor for selectively operating said start switch into its respective closed and open positions, a forward circuit for energizing said run winding in the forward direction from said line, a reverse circuit for energizing said run winding in the reverse direction from said line, means responsive to operation of said program controller into a first of its control positions for completing said forward circuit, so that starting of forward rotation of said rotor is effected, means responsive to operation of said program controller into a second of its control positions for interrupting said forward circuit and for preparing said reverse circuit, a reversing switch, means controlled by said mechanism in response to the reduction in the forward speed of said rotor from said high speed to said low speed following interruption of said forward circuit for operating said reversing switch to complete said prepared reverse circuit, so that dynamic braking of forward rotation of said rotor is brought about and then starting of reverse rotation of said rotor is effected, means responsive to operation of said program controller into a third of its control positions for interrupting said reverse circuit and for preparing said forward circuit, and means controlled by said mechanism in response to the reduction in the reverse speed of said rotor from said high speed to said low speed following interruption of said reverse circuit for completing said prepared forward circuit, so that dynamic braking of reverse rotation of said rotor is brought about and then starting of forward rotation of said rotor is again effected.

5. In combination, an electric motor provided with a reversible rotor and a stator having start and run windings, a source of electric power, a start switch having closed and open positions, a start circuit including said start switch in its closed position for connecting said start winding to said power source, a control switch having forward and reverse positions, a reversing switch having forward and reverse positions, a forward circuit including said control switch in its forward position and said reversing switch in its forward position for connecting said run winding in the forward direction to said power source, a reverse circuit including said control switch in its reverse position and said reversing switch in its reverse position for connecting said run winding in the reverse direction to said power source, a control device for selectively operating said control switch between its forward and reverse positions, speed-responsive mechanism operated by said rotor, first means controlled by said mechanism for selectively operating said start switch between its closed and open positions, and second means controlled by said mechanism for selectively operating said reversing switch between its forward and reverse positions.

6. The combination set forth in claim 5, wherein said mechanism is responsive to a relatively low speed of said rotor to control said first means to operate said start switch into its closed position and responsive to a relatively high speed of said rotor to control said first means to operate said start switch into its open position, and wherein said mechanism is responsive to a change in the speed of said rotor from said high speed to said low speed to control said second means to operate said reversing switch from the occupied one of its positions into the unoccupied other of its positions.

7. In combination, an electric motor provided with a reversible rotor and a stator having start and run windings, a source of electric power, a start switch having closed and open positions, a start circuit including said start switch in its closed position for connecting said start winding to said power source, a control switch having forward and reverse positions, a reversing switch having forward and reverse positions, a forward circuit including said control switch in its forward position and said reversing switch in its forward position for connecting said run winding in the forward direction to said power source, a reverse circuit including said control switch in its reverse position and said reversing switch in its reverse position for connecting said run winding in the reverse direction to said power source, a control device for selectively operating said control switch between its forward and reverse positions, a stepping device having a number of odd positions each operating said reversing switch into its forward position and a number of even positions each operating said reversing switch into its reverse position, speed-responsive mechanism operated by said rotor, first means controlled by said mechanism for selectively operating said start switch between its closed and open positions, and second means controlled by said mechanism for successively operating said stepping device into the adjacent ones of its odd and even positions.

8. In combination, an electric motor provided with a reversible rotor and a stator having start and run windings, a source of electric power, a start switch having closed and open positions, a start circuit including said start switch in its closed position for connecting said start winding to said power source, a control switch having forward and reverse positions, a reversing switch having forward and reverse positions, a forward circuit including said control switch in its forward position and said reversing switch in its forward position for connecting said run winding in the forward direction to said power source, a reverse circuit including said control switch in its reverse position and said reversing switch in its reverse position for connecting said run winding in the reverse direction to said power source, a program controller of the stepping type having a number of odd positions each operating said control switch into its forward position and a number of even positions each operating said control switch into its reverse position, speed-responsive mechanism operated by said rotor, first means controlled by said mechanism for selectively operating said start switch between its closed and open positions, and second means controlled by said mechanism for selectively operating said reversing switch between its forward and reverse positions.

9. In combination, an electric motor provided with a reversible rotor and a stator having start and run windings, a source of electric power, a start switch having closed and open positions, a start circuit including said start switch in its closed position for conecting said start winding to said power source, a control switch having forward and reverse positions, a reversing switch having forward and reverse positions, a forward circuit including said control switch in its forward position and said reversing switch in its forward position for connecting said run winding in the forward direction to said power source, a reverse circuit including said control switch in its reverse position and said reversing switch in its reverse position for connecting said run winding in the reverse direction to said power source, a control device for selectively operating said control switch between its forward and reverse positions, an element having restored and operated positions, means responsive to a relatively high speed of said rotor for operating said control switch into its open position and for actuating said element into its operated position and responsive to a relatively low speed of said rotor for operating said control switch into its closed position and for actuating said element into its restored position, and means responsive to actuation of said element from its operated position into its restored position for operating said reversing switch from the occupied one of its positions into the unoccupied other of its positions.

10. In combination, an electric motor provided with a reversible rotor and a stator having start and run windings, a source of electric power, a start switch having closed and open positions, a start circuit including said start switch in its closed position for connecting said start winding to said power source, a control switch having forward and reverse positions, a reversing switch having forward and reverse positions, a forward circuit including said control switch in its forward position and said reversing switch in its forward position for connecting said run winding in the forward direction to said power source, a reverse circuit including said control switch in its reverse position and said reversing switch in its reverse position for connecting said run winding in the reverse direction to said power source, a control device for selectively operating said control switch between its forward and reverse positions, an element having restored and operated positions, means responsive to a relatively high speed of said rotor for operating said control switch into its open position and for actuating said element into its operated position and responsive to a relatively low speed of said rotor for operating said control switch into its closed position and for actuating said element into its restored position, manually operable means for actuating said element from its restored position into its operated position and then back into its restored position, and means responsive to actuation of said element from its operated position into its restored position for operating said reversing switch from the occupied one of its positions into the unoccupied other of its positions.

11. In combination, an electric motor provided with a reversible rotor and a stator having start and run windings, a source of electric power, a start switch having closed and open positions, a start circuit including said start switch in its closed position for connecting said start winding to said power source, a control switch having forward and reverse positions, a reversing switch having forward and reverse positions, a forward circuit including said control switch in its forward position and said reversing switch in its forward position for connecting said run winding in the forward direction to said power source, a reverse circuit including said control switch in its reverse position and said reversing switch in its reverse position for connecting said run winding in the reverse direction to said power source, a control device for selectively operating said control switch between its forward and reverse positions, an element having restored and operated positions, means responsive to a relatively high speed of said rotor for operating said control switch into its open position and for actuating said element into its operated position and responsive to a relatively low speed of said rotor for operating said control switch into its closed position and for actuating said element into its restored position, said element also being actuated into its restored position in the event of failure of said power source while it is in its operated position, a part having a normally active position and movable into an inactive position in the event of failure of said power source, and means controlled jointly by actuation of said element from its operated position into its restored position and by said part in its active position for operating said reversing switch from the occupied one of its positions into the unoccupied other of its positions.

12. In combination, an electric motor provided with a reversible rotor and a stator having start and run windings, a source of electric power, a start switch having closed and open positions, a start circuit including said start switch in its closed position for connecting said start winding to said power source, a control switch having forward and reverse positions, a reversing switch having forward and reverse positions, a forward circuit including said control switch in its forward position and said reversing switch in its forward position for connecting said run winding in the forward direction to said power source, a reverse circuit including said control switch in its reverse position and said reversing switch in its reverse position for connecting said run winding in the reverse direction to said power source, a control device for selectively operating said control switch between its forward and reverse positions, speed-responsive mechanism operated by said rotor, first means controlled by said mechanism for selectively operating said start switch between its closed and open positions, an element having restored and operated positions, second means controlled by said mechanism for selectively actuating said element between its restored and operated positions, and means responsive to actuation of said element from its operated position into its restored position for operating said reversing switch from the occupied one of its positions into the unoccupied other of its positions.

13. In combination, an electric motor provided with a reversible rotor and a stator having start and run windings, a source of electric power, a start switch having closed and open positions, a start circuit including said start switch in its closed position for connecting said start winding to said power source, a control switch having forward and reverse positions, a reversing switch having forward and reverse positions, a forward circuit including said control switch in its forward position and said reversing switch in its forward position for connecting said run winding in the forward direction to said power source, a reverse circuit including said control switch in its reverse position and said reversing switch in its reverse position for connecting said run winding in the reverse direction to said power source, a control device for selectively operating said control switch between its forward and reverse positions, speed-responsive mechanism operated by said rotor, first means controlled by said mechanism for selectively operating said start switch between its closed and open positions, an element having restored and operated positions, second means controlled by said mechanism for selectively actuating said element between its restored and operated positions, a part having active and inactive positions, means for selectively actuating said part between its active and inactive positions, and means controlled jointly by actuation of said element from its operated position into its restored position and by said part in its active position for operating said reversing switch from the occupied one of its positions in the unoccupied other of its positions.

References Cited in the file of this patent

UNITED STATES PATENTS 2,380,270    Suhr et al. _____ July 10, 1945
2,536,256    Berg _____ Jan. 2, 1951

UNITED STATES PATENT OFFICE
CERTIFICATE OF CORRECTION

Patent No. 3,044,000                  July 10, 1962

Nassouh H. Bahra

It is hereby certified that error appears in the above numbered patent requiring correction and that the said Letters Patent should read as corrected below.

Column 10, line 9, for "to complete said prepared reverse circuit," read -- , and means responsive to the reduction --; line 12, for "camplete" read -- complete --; line 31, for "operations" read -- operation --.

Signed and sealed this 4th day of December 1962.

(SEAL)
Attest:

ERNEST W. SWIDER
Attesting Officer

DAVID L. LADD
Commissioner of Patents